United States Patent
Rusek

(10) Patent No.: US 9,071,316 B2
(45) Date of Patent: Jun. 30, 2015

(54) METHOD FOR DETECTION OF SYMBOLS IN COMMUNICATION SIGNALS

(71) Applicant: Huawei Technologies Co., Ltd., Shenzhen (CN)

(72) Inventor: Fredrik Rusek, Lund (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/045,832

(22) Filed: Oct. 4, 2013

(65) Prior Publication Data

US 2015/0098533 A1    Apr. 9, 2015

(51) Int. Cl.
*H04B 1/10* (2006.01)
*H04L 25/03* (2006.01)

(52) U.S. Cl.
CPC ........ *H04B 1/1027* (2013.01); *H04L 25/03006* (2013.01); *H04L 2025/03426* (2013.01)

(58) Field of Classification Search
CPC ............. H04B 1/7107; H04B 1/71055; H04B 1/71072; H04B 2001/71077; H04B 7/0434; H04B 7/0854; H04B 1/1027; H03M 13/2957; H03M 13/2975; H03M 13/3776; H03M 13/6306; H03M 13/6331; H03M 13/6525; H03M 13/653; H04L 25/03006; H04L 2025/03426; H04L 1/005; H04L 25/03171; H04L 25/0204; H04L 1/06; H04L 25/0224; H04L 25/067; H04L 27/2647; H04L 2025/03414; H04L 25/03159
USPC ......... 375/262, 271, 286, 295, 299, 306, 316, 375/318, 320–322, 330, 338, 340, 341, 342, 375/345, 346, 350
See application file for complete search history.

(56) References Cited

U.S. PATENT DOCUMENTS

| | | | |
|---|---|---|---|
| 8,792,594 B2 * | 7/2014 | Vojcic et al. | 375/340 |
| 2005/0265465 A1 * | 12/2005 | Hosur et al. | 375/260 |
| 2006/0018410 A1 * | 1/2006 | Onggosanusi et al. | 375/340 |

(Continued)

FOREIGN PATENT DOCUMENTS

CN    101494462 B    2/2012

OTHER PUBLICATIONS

Optimal Channel Shortening for MIMO and ISI Channels, IEEE, Feb. 2012, pp. 810-818.*

(Continued)

*Primary Examiner* — Hirdepal Singh
(74) *Attorney, Agent, or Firm* — Conley Rose, P.C.; Grant Rodolph; Nicholas K. Beaulieu

(57) ABSTRACT

The present invention relates to method for detection of symbols, comprising: receiving at least one communication signal y transmitted over a radio channel H, and receiving a priori LLRs of said channel inputs x; computing soft symbol estimates μ and variance D of said channel inputs x based on LLRs of said channel inputs x; filtering and interference cancelling said received signal y by using a first filter and filtered soft symbol estimates μ so as to obtain a filtered and interference cancelled received signal; estimating MSE matrix B of said filtered and interference cancelled received signal; computing an optimal matrix $G_{opt}$ for a BCJR algorithm based on said MSE estimate B; further filtering said filtered and interference cancelled received signal by using a second filter so as to obtain an input signal r to the BCJR algorithm; and feeding said input signal r into the BCJR algorithm.

15 Claims, 7 Drawing Sheets

(56) References Cited

U.S. PATENT DOCUMENTS

| | | | | |
|---|---|---|---|---|
| 2007/0116143 | A1* | 5/2007 | Bjerke et al. | 375/262 |
| 2009/0103666 | A1* | 4/2009 | Zhao et al. | 375/341 |
| 2013/0114765 | A1* | 5/2013 | Annavajjala et al. | 375/341 |
| 2013/0156139 | A1* | 6/2013 | Lee et al. | 375/341 |
| 2013/0177048 | A1* | 7/2013 | Yu et al. | 375/211 |
| 2014/0066114 | A1* | 3/2014 | Kwon et al. | 455/501 |

OTHER PUBLICATIONS

Colavolpe, G., et al., "On MAP Symbol Detection for ISI Channels Using the Ungerboeck Observation Model," IEEE Communications Letters, vol. 9, No. 8, Aug. 2005, pp. 720-722.

Falconer, D. D., et al., "Adaptive Channel Memory Truncation for Maximum Likelihood Sequence Estimation." American Telephone and Telegraph Company, The Bell System Technical Journal, vol. 52, No. 9, Nov. 1973, 22 pages.

Forney, G., D., "Maximum-Likelihood Sequence Estimation of Digital Sequences in the Presence of Intersymbol Interference," IEEE Transactions on Information Theory, vol. IT-18, No. 3, May 1972, pp. 363-378.

Rusek, F., et al., "Optimal Channel Shortening for MIMO and ISI Channels," IEEE Transactions on Wireless Communications, vol. 11, No. 2, Feb. 2012, pp. 810-818.

Ungerboeck, G., "Adaptive Maximum-Likelihood Receiver for Carrier-Modulated Data-Transmission Systems," IEEE Transactions on Communications, vol. COM-22, No. 5, May 1974, pp. 624-636.

Rusek, F., et al., "Optimal Channel Shortening for MIMO and ISI Channels," IEEE Transactions on Wireless Communications, vol. 11, No. 2, XP011414997, Feb. 2012, pp. 810-818.

Foreign Communication From a Counterpart Application, European Application No. 13187322.6, Extended European Search Report dated Mar. 5, 2014, 5 pages.

\* cited by examiner

METHOD FOR DETECTION OF SYMBOLS IN COMMUNICATION SIGNALS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present method relates to a method for detection of symbols carried in communication signals. Furthermore, the invention also relates to a detection device, a computer program, and a computer program product thereof.

BACKGROUND

Consider any linear channel of the form y=Hx+n where H is an M×N matrix of channel gains, x is an N×1 vector of channel inputs, and n is an M×1 vector of independent identically distributed (IID) complex Gaussian noise variables with mean 0 and covariance matrix $N_0 I$.

We are interested in the problem of soft-input, soft-output detection of the vector x. This can be readily done through the Bahl-Cook-Jelinke-Raviv (BCJR) algorithm, but the complexity per detected symbol is $O(|\Omega|^K)$ where $\Omega$ is the modulation alphabet and K is the memory of the channel matrix H. The memory is a central theme and we will next define what we mean by this term. Let us do a QL factorization of the channel matrix H, so that we write H=QL. Then, without loss of generality, we can define the filtered observed vector $r=Q^*y=Lx+w$, where w≡n in distribution. Now we make the following definition of the memory of any channel H.

Definition 1: If the non-zero elements in L are confined to the first K+1 diagonals of L, then the memory of H is K, and optimal demodulation has complexity $O(|\Omega|^K)$.

Note that we have made no claims what the channel matrix H may represent. This innovation assumes an arbitrary H, so that it encompasses, e.g., inter-symbol interference (ISI) channel (e.g., encountered for example in satellite transmission), multiple-input multiple-output (MIMO) (e.g., encountered for example in the Long Term Evolution (LTE) downlink), MIMO-ISI (e.g., encountered for example in the LTE uplink), inter-channel-interference (ICI) (e.g., encountered for example in the LTE downlink with high Doppler spread), etc. The reader can with benefit keep the ISI example in mind, where the memory K is simply the number of taps minus one of the channel impulse response.

Another central theme within information and communication theory is channel capacity. This is defined as the highest possible rate that can be carried through the channel with zero error rate. As we have not made any definition of the concept of "time", we will measure channel capacity as the nats per channel use that can be reliably transmitted. Achieving capacity requires an optimization over the input distribution of x and this must be matched to the actual communication channel H (via waterfilling), but in this innovation we assume that no knowledge of H is available at the transmitter so that such optimization is not possible. Then, the word capacity is strictly speaking not correct, but we will stick with the term although it is a slight abuse of notation.

Fact 1: The capacity of the linear Gaussian vector channel, measured in nats per channel use is $$C = \text{logdet}\left(1 + \frac{PHH^*}{N_0}\right),$$

where the inputs x are distributed as CN(0, PI).

This capacity can be rewritten as,

Fact 2: Straightforward manipulations using the chain rule of mutual information yields $$C = \sum_{n=1}^{N} I(x_n; y | x_{n-1}, \ldots, x_1),$$

where I(x; y) is the standard mutual information operator.

The meaning of the memory concept can be included into Fact 2, in order to obtain, Fact 3: If the memory of the channel H is K, then $$C = \sum_{n=1}^{N} I(x_n; y | x_{n-1}, \ldots, x_{n-K}),$$

where $x_k = \{\phi\}$, k≤0.

Finally, the following result is well known,

Fact 4: With an optimal detector of x given y, the capacity of the channel can be reached.

Let us summarize: to every linear channel H, there is an associated memory and a channel capacity. The channel capacity can be reached if the receiver is making use of an optimal detector for x, and this detector has a complexity that is exponential in the memory K. Note that our measure of receiver complexity assumes discrete inputs while the capacity requires Gaussian distributed inputs. However, the Gaussian input capacity typically represents the discrete input limit very well up to a certain signal-to-noise ratio (SNR) threshold that depends on the cardinality of the inputs. Therefore, the value C is of operational interest even if the system is using discrete inputs rather than Gaussian.

Problems arise if the channel memory K is big so that the complexity $|\Omega|^K$ is beyond the allowed complexity budget. This is a common situation in practice and reduced complexity techniques must therefore be looked into. A few examples are for example the LTE link where the channel memory is often 10 or so, and with 64-quadrature amplitude modulation (QAM) inputs this yields a complexity $2^{60}$ per transmitted symbol. This is one of the reasons why orthogonal frequency-division multiplexing (OFDM) is typically preferred over single carrier in LTE. Another example is the Global System for Mobile Communications (GSM) link where the memory of the channel is around 7-10. In GSM, contrary to the LTE case, this memory is indeed handled by a reduced trellis based receiver.

The amount of research that has been devoted to constructing a low-complexity, yet high performance, receiver solution for large memories is massive. One such group of receivers is the channel shortening (CS) receivers. The rationale behind the CS receiver is the following:

Filter a received signal y with a pre-filter W, r=Wy.

The aim of W is to "compress" the memory of channel H to a smaller value.

The effective channel is now T=WH and this has by assumption a smaller memory than K, denote it by L. We now have r=Wy=Tx+(Wn), where Wn is filtered noise.

Apply the BCJR algorithm to the signal r where the memory is L by definition.

The outcome of steps 1-4 is near-optimal detection, but with complexity $O(|\Omega|^L)$ instead of $O(|\Omega|^K)$.

How "near-optimal detection" we really have is determined by the particular choices of W and T, respectively.

It is reminded that we have a pure matrix-valued notation here. In the case of an ISI channel, the channel matrix H becomes a Toeplitz matrix representing a convolution. Then the filter W is also a convolution matrix which is well known.

This scheme of CS receivers was invented already in 1973 by Falconer and Magee, and they gave an explicit choice of the two CS parameters W and T. A block diagram of the CS idea is provided in FIG. 1. The order of operations carried out in CS is illustrated in FIG. 1: (i) Based on the channel matrix H, the noise density $N_0$ and the memory of the BCJR L, the pre-filter W and the effective channel T is computed; (ii) The received signal y is then filtered by the pre-filter W which produces the vector r. (iii) A BCJR, where the BCJR operations are specified by the matrix T, is finally applied on the vector r. Note that if we set L=0, then the standard zero-forcing equalizer and the minimum mean square error (MMSE) equalizer falls within the CS framework.

SUMMARY

An objective of the present invention is to provide a solution which mitigates or solves the drawbacks and problems of prior art solutions.

Another objective of the present invention is to provide a method which provides improved decoding performance compared to prior art methods.

According to a first aspect of the invention, the above mentioned and other objectives are achieved by a method for detection of symbols carried in received communication signals, the method comprising the steps of: receiving at least one communication signal y transmitted over a radio channel H, wherein said received signal y comprises encoded radio channel symbol inputs x, and receiving a priori Log Likelihood Ratios (LLRs) of said channel inputs x; and the method further comprising the steps of: a) computing soft symbol estimates μ and variance D of said channel inputs x based on LLRs of said channel inputs x; b) filtering and interference cancelling said received signal y by using a first filter and filtered soft symbol estimates μ so as to obtain a filtered and interference cancelled received signal; c) estimating the Mean Square Error (MSE) matrix B of said filtered and interference cancelled received signal; d) computing an optimal matrix $G_{opt}$ for a BCJR algorithm based on said MSE estimate B, wherein said optimal matrix $G_{opt}$ specifies the BCJR algorithm; e) further filtering said filtered and interference cancelled received signal by using a second filter so as to obtain an input signal r to the BCJR algorithm, the second filter being derived from said optimal matrix $G_{opt}$; and f) feeding said input signal r into the BCJR algorithm so as to obtain extrinsic LLRs of said channel inputs x.

According to an embodiment of the method, the LLRs of said channel inputs x in step a) is obtained from a decoder, and the method further comprises the steps of: g) feeding said extrinsic LLRs into the decoder so as to obtain updated LLRs of said channel inputs x; and h) repeating steps a)-g) i number of times by using said updated LLRs in step a) to compute soft symbol estimates μ and variance D. The decoder may e.g., be an error correcting code (ECC) decoder.

According to another embodiment of the method, the first filter is a modified Wiener filter for said radio channel inputs x having mean μ and variance D.

According to yet another embodiment of the method, the kth element of said filtered and interference cancelled received signal has the form $r_k = E(x_k|y,\mu_l)$, $l \notin I_k$ where E( ) is the expectation operator and $I_k$ is a set of indices that depends on k in a pre-determined fashion, and wherein the vector comprising $r_k$, $\forall k$, is denoted by $E(x|y,\mu)$. According to this embodiment of the method, said set of indices $I_k$ is $I_k = I_k = \{k-L, k-L+1, \ldots k+L-1, k+L\} \cap \{1, 2, \ldots, N\}$, where N is the total number of elements in said channel inputs x and L is the memory of the BCJR algorithm. Further according to this embodiment of the method, said optimal matrix $G_{opt}$ is solely dependent on said MSE estimate B and the memory L. Further according to this embodiment of the method, the memory L can be arbitrarily chosen. And yet further according to this embodiment of the method, said MSE estimate B has the form $B(\mu) = E[(x-E(x|y,\mu))(x-E(x|y,\mu))^*]$, where the superscript "*" denotes the Hermitian transpose operator.

According to yet another embodiment of the method, the second filter has the form $(G_{opt}+I)$, where I is the identity matrix. According to this embodiment said input signal r to said BCJR algorithm is obtained as: $r=(G_{opt}+I)E(x|y,\mu)$.

According to yet another embodiment of the method, said radio channel H is a linear radio channel.

According to yet another embodiment of the method, the communication signal is transmitted in a cellular wireless communication system, such as 3rd Generation Partnership Project (3GPP) communication systems.

The present invention also relates to a computer program, having code means, which when run by processing means causes said processing means to execute the method according to the invention. Further, the invention concerns a computer program product comprising a computer readable medium and the computer program, wherein the computer program is included in the computer readable medium and comprises one or more from the group: Read-Only Memory (ROM), Programmable ROM (PROM), Erasable PROM (EPROM), Flash memory, Electrically EPROM (EEPROM), hard disk drive or any other suitable computer readable medium.

According to a second aspect of the invention, the above mentioned and other objectives are achieved by a detection device arranged for detection of symbols carried in received communication signals, the receiver comprising a processor arranged to: receive at least one communication signal y transmitted over a radio channel H, wherein said received signal y comprises encoded radio channel symbol inputs x, and receive a priori LLRs of said channel inputs x; and the processor being further arranged to: a) compute soft symbol estimates μ and variance D of said channel inputs x based on LLRs of said channel inputs x; b) filter and interference cancel said received signal y by using a first filter and filtered soft symbol estimates μ so as to obtain a filtered and interference cancelled received signal; c) estimate the MSE matrix B of said filtered and interference cancelled received signal; d) compute an optimal matrix $G_{opt}$ for a BCJR algorithm based on said MSE estimate B, wherein said optimal matrix $G_{opt}$ specifies the BCJR algorithm; e) further filter said filtered and interference cancelled received signal by using a second filter so as to obtain an input signal r to the BCJR algorithm, the second filter being derived from said optimal matrix $G_{opt}$; and f) feed said input signal r into the BCJR algorithm so as to obtain extrinsic LLRs of said channel inputs x.

According to an embodiment of the detection device, the LLRs of said channel inputs x in step a) is obtained from a decoder, and the processor is further arranged to: g) feed said extrinsic LLRs into the ECC decoder so as to obtain updated LLRs of said channel inputs x; and h) repeat steps a)-g) i number of times by using said updated LLRs in step a) to compute soft symbol estimates μ and variance D.

The present invention provides a method and a device for obtaining extrinsic LLRs of channel inputs x. The mentioned extrinsic LLRs can be used in many different applications, such as iterative detection of encoded data transmitted over radio channels, enhanced inter-cell interference coordination (E-ICIC) of the LTE downlink, satellite communication using the digital video broadcasting satellite (DVB-S) standards, to name but a few.

According to preferred embodiments the present solution is used in an iterative detection algorithm with an outer ECC decoder. By using the extrinsic LLRs and iterating the performance is improved.

Further applications and advantages of the invention will be apparent from the following detailed description.

BRIEF DESCRIPTION OF THE DRAWINGS

The appended drawings are intended to clarify and explain different embodiments of the present invention in which.

DETAILED DESCRIPTION

Figure 1:
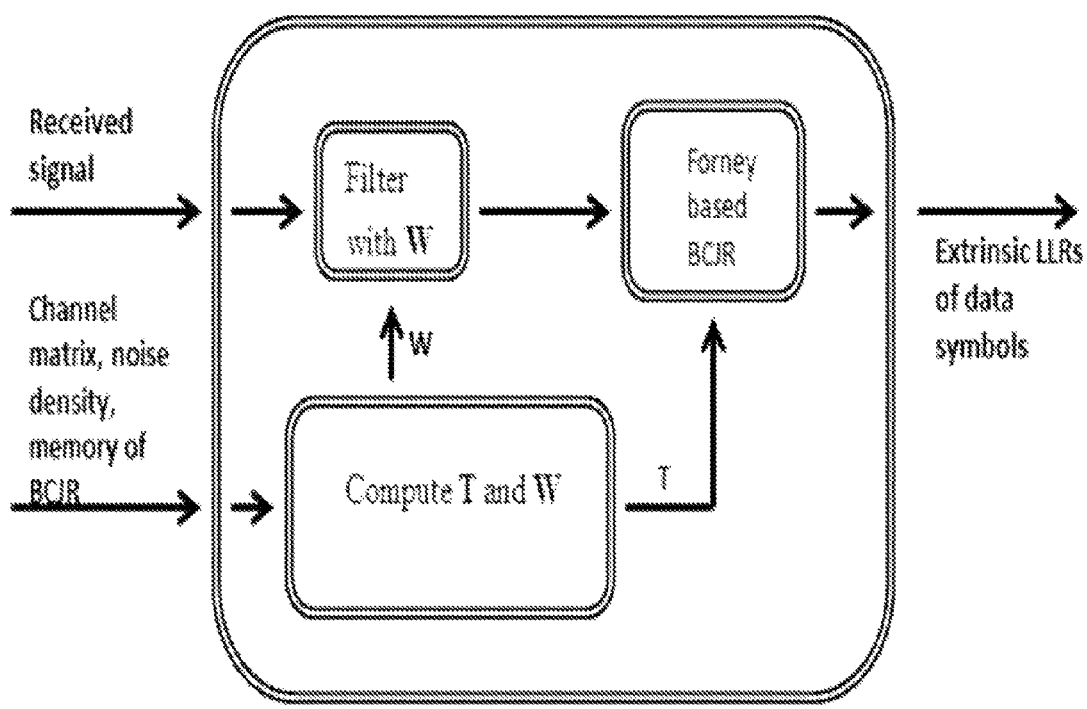
FIG. 1 illustrates a system model of a CS receiver.

In the present disclosure bold face uppercase letters denote matrices and bold face lowercase letters denote vectors.

As mentioned above, the history of CS dates more than four decades back. However, Falconer and Magee's original idea is not at all related to the concept of capacity. Instead it optimizes W and T based on an MMSE cost function. This has only a very vague connection with capacity, and it is unclear what rates are actually achievable with Falconer and Magee's receiver.

From Fact 4 we know that the channel capacity C can be reached by using an optimal full complexity receiver. Since we are using a reduced receiver with much less complexity, it is natural to expect that the capacity C cannot be achieved. In all subsequent CS work spurred by Falconer and Magee's work, no attention has been paid to what the penalty of using CS compared to the full complexity receiver really is. No papers studied a capacity related cost function and tried to optimize it.

However, a breakthrough came in 2012 with a paper by F. Rusek and A. Prlja., "Optimal channel shortening for MIMO and ISI channels", *IEEE Transactions on Wireless Communications*, February 2012.

In this paper, the CS concept was optimized from a capacity perspective and established the CS parameters that will allow for the highest possible rates of any CS detector. There are a number of important results in this paper and we will review parts of these next as they will be important building blocks later.

Fact 5: If the parameters of the CS receiver are appropriately optimized, then it can allow for a rate per channel use which equals $$C_{CS} = \sum_{n=1}^{N} I(x_n; y \mid x_{n-1}, \ldots, x_{n-L}).$$

Hence, it can implement the chain rule of mutual information up to the reduced memory length L.

Fact 5 reveals the intuitive result that CS is closely connected to the optimal detector, but it cannot exploit dependencies among symbols further away than the reduced memory length L. Another very important result of this paper is that the optimal solution cannot be reached from the normal CS system model outlined in steps 1-6 described above. The system model in the CS literature up to "Optimal channel shortening for MIMO and ISI channels" had been the so called Forney observation model, but in "Optimal channel shortening for MIMO and ISI channels" it was shown that this must be changed in favor of the Ungerboeck observation model. The current innovation is based on the Ungerboeck model and we must therefore describe also the Ungerboeck model.

Steps 1-6 of the CS receiver described above implies that the receiver operates according to a mismatched probability density function (pdf), $$q(y \mid x) \propto \exp\left(-\frac{\|Wy - Tx\|^2}{N_0}\right),$$

where ∝ denotes that all terms not related to x have been omitted. As a reference, the optimal full complexity receiver operates according to, $$p(y \mid x) \propto \exp\left(-\frac{\|y - Hx\|^2}{N_0}\right).$$

The mismatched pdf q(y|x) directly specifies the BCJR operations. Now, the Ungerboeck model is obtained by rewriting p(y|x) as, $$p(y \mid x) \propto \exp\left(-\frac{\|y - Hx\|^2}{N_0}\right) \propto \exp\left(-\frac{2\text{Re}\{x^* H^* y\} - x^* H^* H x}{N_0}\right). \quad (1)$$

Equation (1) is what we mean by the term "Ungerboeck model". The CS concept in view of the Ungerboeck model is now to modify the last expression of (1) into, $$q(y|x) \propto \exp(-2Re\{x^* H_{opt}^* y\} + x^* G_{opt} x). \quad (2)$$

We have now moved from the two CS parameters W and T into two different CS parameters $H_{opt}$ and $G_{opt}$ in the Ungerboeck model. The constraint of memory L that we had before of the matrix T becomes in the Ungerboeck model, Definition 2: For an Ungerboeck model with a Hermitian matrix $G_{opt}$ the memory L is defined as the number of diagonals above (or equivalently below) the main diagonal that hold non-zero elements.

An important result is the following,

Fact 6: For an Ungerboeck model with memory L, there exists an algorithm (Colavolpe, G. and Barbieri, A., "On MAP symbol detection for ISI channels using the ungerboeck observation model", Communications Letters, IEEE (Volume: 9, Issue: 8), pp, 720-722 August 2005) that is fully equivalent to the BCJR, that produces the same output and has the same detection complexity, namely $O(|\Omega|^L)$.

Hence, the Ungerboeck model is equivalent to the Forney model in terms of complexity, but for CS there is a crucial difference, namely, Fact 7: For CS, the Ungerboeck model provides more degrees of freedom in selecting CS parameters as the matrix $G_r$ need not be positive definite. Somewhat surprising, the outcome is often that the optimal matrix is indeed not positive definite. When this occurs, the Ungerboeck CS offers a performance that is not reachable for Forney CS, which means that the rate in Fact 5 is not reachable for Forney based CS.

Figure 2:
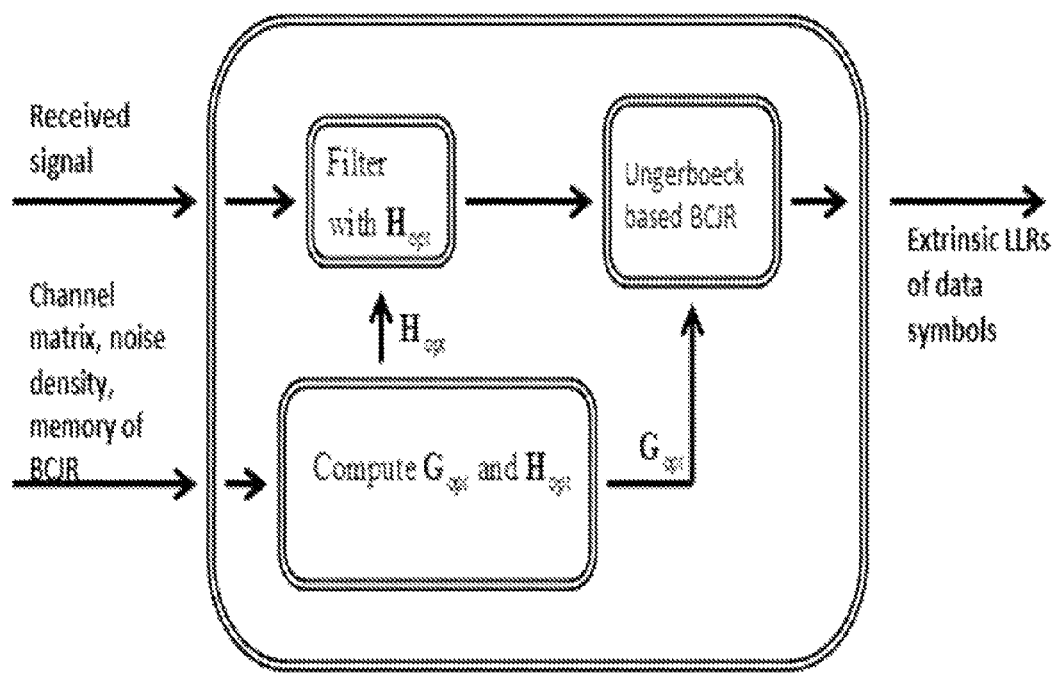
FIG. 2 illustrates the system model of an Ungerboeck based CS.

When an Ungerboeck based CS receiver is used, the system model in FIG. 1 is changed to the one in FIG. 2. As can be seen by comparing FIG. 1 and FIG. 2, similar operations are carried out in Ungerboeck based CS as in Forney based CS. The difference lies in the fact that the BCJR algorithm in Ungerboeck based CS requires different type of matrices, i.e., $G_{opt}$ and $H_{opt}$, instead of T and W.

Due to Fact 7, we shall stick to the Ungerboeck model as we know that it is more general and contains receiver parameters that are not available in the Forney model. Due to Fact 6, we know that there is a BCJR for the Ungerboeck model, which implies that all our results are of operational meaning.

The Ungerboeck based CS receiver from "Optimal channel shortening for MIMO and ISI channels" presented in the previous section (although no equations were given) represents prior art of the CS art. It maximizes the transmission rate that can be used when a CS receiver is adopted.

However, the inventor has identified the following: in modern wireless communication systems, the receiver iterates between detection of the channel H and an outer error correcting code (ECC) decoder. Hence, in all iterations, except in the first step, of the channel detector, there is prior information about the data symbols x. Therefore, the inventor concludes that the prior information should somehow be taken into consideration when designing the CS detector and the parameters $H_{opt}$ and $G_{opt}$ should reflect the prior information. Prior information is characterized through a priori LLRs of the input symbols x.

So, all prior art has neglected the fact that the CS parameters should be changed over the iterations, and that they should also be dependent on the quality of the LLRs of the channel inputs x provided by the outer ECC decoder. However, there exists no prior attempts to design capacity optimized CS detectors that take prior information into account through interference cancellation. This problem is challenging as there were no closed form expressions of the CS capacity that could be utilized until the paper "Optimal channel shortening for MIMO and ISI channels" was published. But from the aforementioned paper, capacity expressions became available which set the stage for the current innovation. However, the paper did not pursue CS detectors that utilized the prior LLRs of the channel inputs x. If the prior LLRs are set to null, the current innovation and the method presented in the paper "Optimal channel shortening for MIMO and ISI channels" coincide. The extension into the case presented here, namely, the prior LLRs are not null, is by no means trivial and cannot be deduced from the paper as no hints on how to deal with this is given.

Therefore, the present invention relates to a method for detection of communication symbols in communication signals transmitted in wireless communication systems. At least one communication signal y is transmitted over a radio channel H, and the received signal y comprises encoded radio channel symbol inputs x. Further, a priori LLRs of the channel inputs x are also received.

The basic method according to the invention further comprises the steps of:

a) computing soft symbol estimates μ and variance D of the channel inputs x based on LLRs of the channel inputs x, which e.g., may be ECC encoded;

b) filtering and interference cancelling the received signal y by using a first filter and filtered soft symbol estimates μ so as to obtain a filtered and interference cancelled received signal;

c) estimating the MSE matrix B of the filtered and interference cancelled received signal;

d) computing an optimal matrix $G_{opt}$ for a BCJR algorithm based on the MSE estimate B, wherein the optimal matrix $G_{opt}$ specifies the BCJR algorithm, the optimal matrix $G_{opt}$ is calculated according to Theorem 2 in "Optimal channel shortening for MIMO and ISI channels";

e) further filtering the filtered and interference cancelled received signal by using a second filter so as to obtain an input signal r to the BCJR algorithm, the second filter being equal to $(G_{opt}+I)$;

f) feeding the input signal r into the BCJR algorithm so as to obtain extrinsic LLRs of the channel inputs x.

The output of the method, i.e., the extrinsic LLRs of the channel inputs x, can be used in many different applications. On the most fundamental level, the context surrounding the innovation is irrelevant. The method can be applied in any scenario where symbols x are observed through a noisy linear vector channel with memory and where some form of prior information of x is present. If those assumptions are fulfilled, the method will produce extrinsic LLRs. Hence, the present method and device can be used as a building block in any system that has a need for such method. The method can therefore find wide spread application areas, ranging from wireless communications to biology.

Moreover, according to an embodiment of the invention, the LLRs of the channel inputs x in step a) above is obtained from a decoder (e.g., an ECC decoder). The method further comprises the steps of:

g) feeding the extrinsic LLRs into the decoder so as to obtain updated LLRs of the channel inputs x; and h) repeating steps a)-g) i number of times by using the updated LLRs in step a) to compute soft symbol estimates μ and variance D.

Thereby, an iterative CS BCJR decoder is provided which uses the information from the decoder to improve the symbol estimations for each iteration step. So, the outcome of the present invention is a CS decoder with computational complexity $O(|\Omega|^L)$ that can reach the rate, $$C_{CS,lt} = \sum_{n=1}^{N} I(x_n; y \mid x_{n-1}, \ldots, x_{n-L}, \mu_m),$$

$$m \in \{1, 2, \ldots, N\}/\{n-L, n-L+1, \ldots, n\},$$

at this particular iteration. Hence, the mutual information based CS receiver has been extended into an iterative receiver that adapts its operations within each iteration step.

This is a very nice and intuitive result. The CS detector can reach exactly what one could hope for, namely that within the memory length, it can condition on the actually transmitted data symbol, but outside it can condition on the estimated symbol from the decoder. Note that as the iterations proceed, the quality of μ becomes better and better. Eventually, if the process converges, μ will become x. A comparison to the result of Fact 5 can now be done. These two rates have the same forms, but the rate in Fact 5 lacks the μ terms. Thus, the rate of the optimized iterative CS detector, stated above, is superior to the rate of the non-iterative detector.

In order to understand the rationale behind the present invention we must briefly go through the steps taken in the optimal Ungerboeck based CS detector for non-iterative receivers described in "Optimal channel shortening for MIMO and ISI channels". The optimal pre-filter $H_{opt}$ is in the non-iterative case shown to be, $$H_{opt} = (G_{opt}+I)H^*(HH^*+N_0I)^{-1} = (G_{opt}+I)Y, Y=H^*(HH^*+N_0I)^{-1}.$$

This is nothing else than the normal Wiener filter Y for data symbols x with x zero mean and unit variance, compensated by the term $(G_{opt}+I)$. If the filter Y is applied to y, then the MSE-matrix can be expressed as, $$B = E\{(Yy-x)(Yy-x)^*\} = I - H^*(HH^*+N_0I)^{-1}H.$$

From Theorem 2 in "Optimal channel shortening for MIMO and ISI channels", it follows that the optimal matrix $G_{opt}$ is dependent solely on the MSE matrix B. In other words, $G_{opt}$ is found (in closed form, see Theorem 2 in "Optimal channel shortening for MIMO and ISI channels") from the MSE-matrix of the Wiener filter applied to y. We denote this dependency as $G_{opt} = \Psi(B)$, where the function $\Psi(.)$ is defined in Theorem 2 of "Optimal channel shortening for MIMO and ISI channels". Then the matrix $H_{opt}$ is simply $H_{opt} = (G_{opt}+I)Y$.

We are now ready to move over to the iterative case and present details of the invention, we will follow the same methodology as what is outlined just above, namely: find Wiener filter, find MSE matrix, find the optimal matrix compensate the Wiener filter with $(G_{opt}+I)$, and apply the BCJR algorithm. The only difference is that we will take into consideration the prior information from an outer ECC decoder. It should be noted that the present method is not limited to a particular ECC or ECC decoder.

In the following an exemplary embodiment of an iterative method according to an embodiment of the invention is described:

1. The ECC decoder produces LLRs on every bit, and we assume that these LLRs are independent due to a perfect interleaver assumption. Suppose that symbol $x_k$ is carrying the $\log_2(\Omega)$ bits $b_k^1, b_k^2, \ldots, b_k^{\log_2(\Omega)}$. We now have, $$\mu_k = E\{x_k\} = \sum_{b_k^1, b_k^2, \ldots, b_k^{\log_2(\Omega)}} Pr(b_k^1, b_k^2, \ldots, b_k^{\log_2(\Omega)}) x(b_k^1, b_k^2, \ldots, b_k^{\log_2(\Omega)}),$$

where $Pr(b_k^1, b_k^2, \ldots, b_k^{\log_2(\Omega)})$ is the probability of a certain outcome of the bits $b_k^1, b_k^2, \ldots, b_k^{\log_2(\Omega)}$, this comes from the outer ECC decoder, and $x(b_k^1, b_k^2, \ldots, b_k^{\log_2(\Omega)})$ is the symbol from the constellation formed from those bits. The variance of $x_k$, denoted by $d_k$, is now $$d_k = E\{|x_k - \mu_k|^2\} = \sum_{b_k^1, b_k^2, \ldots, b_k^{\log_2(\Omega)}} Pr(b_k^1, b_k^2, \ldots, b_k^{\log_2(\Omega)}) |x(b_k^1, b_k^2, \ldots, b_k^{\log_2(\Omega)}) - \mu_k|^2.$$

The vector μ is formed by stacking all $\mu_k$s on top of each other, and the matrix D is a diagonal matrix with $d_k$ as its kth diagonal element.

2. Define the index set $I_k = \{k-L, k-L+1, \ldots k+L-1, k+L\} \cap \{1, 2, \ldots, N\}$. For a given symbol position k, this is the set of indexes around k that is at most L symbols away (in any direction). We can now formulate a modified Wiener filter of symbol $x_k$ that is not utilizing any prior information from the ECC decoder about symbols in $I_k$. Such Wiener filtering reads $E(x_k|y, \mu_{l \notin I_k}) = H_k^*(HD_kH^* + N_0I)(y - \breve{H}_k\mu)$, where $H_k$ is the kth column of H, $\breve{H}_k$ are the columns of H with column indexes in $I_k$, and $D_k$ is the matrix D but where the elements at positions in $I_k$ are equal to 1. In other words, this modified Wiener filter is ignoring the prior information from the ECC decoder at ±L positions away from the symbol $x_k$. We can express the modified Wiener filtering over all the symbols in vector form as, $$E(x|y, \mu) = \begin{bmatrix} E(x_1|y, \mu_{l \notin I_1}) \\ \vdots \\ E(x_N|y, \mu_{l \notin I_N}) \end{bmatrix} = \Upsilon y - F\mu$$

where $$\Upsilon = \begin{bmatrix} \gamma_1 \\ \vdots \\ \gamma_N \end{bmatrix}, \gamma_k = H_k^*(HD_kH^* + N_0I), F_{ij} = \begin{cases} \gamma_i H_j, & |i-j| \leq \nu \\ 0, & |i-j| > \nu. \end{cases}$$

We point out that the filtered and interference cancelled version of y is denoted as an expectation $E(x|y, \mu)$. This is so since the filtered version is actually the expected value of x given y and μ (except that some symbols of x are not utilizing the values in μ).

3. The MSE of the filtered and interference cancelled signal $B(\mu) = E[(x-E(x|y, \mu))(x-E(x|y, \mu))^*]$ can be straightforwardly computed as, $$B(\mu) = (I-YH)(I-YH)^* + N_0YY^* + F(I-\sqrt{D})(I-\sqrt{D})^*F^* + (I-YH)(I-\sqrt{D})^*F^* + F(I-\sqrt{D})(I-YH)^*.$$

From this expression we can clearly see the dependency on the MSEs from the prior information μ. By using μ=0, we can see that the above equations in steps 2-3 collapse down into the equations in the prior art described in the introduction of Section 2.2.2. Thus, using "μ>0" is an important aspect.

4. Compute the optimal matrix $G_{opt} = \Psi(B(\mu))$. This is done according to Theorem 2 in the paper "Optimal channel shortening for MIMO and ISI channels".

5. Construct a vector $r = (G_{opt}+I)E(x|y, \mu)$.

6. Feed the vector r from step 5 and the matrix $G_{opt}$ from step 4 to an Ungerboeck BCJR; it should be noted that the noise density has been absorbed by the optimal matrix $G_{opt}$ so the BCJR should work with a noise density equal to 1.

Figure 3:
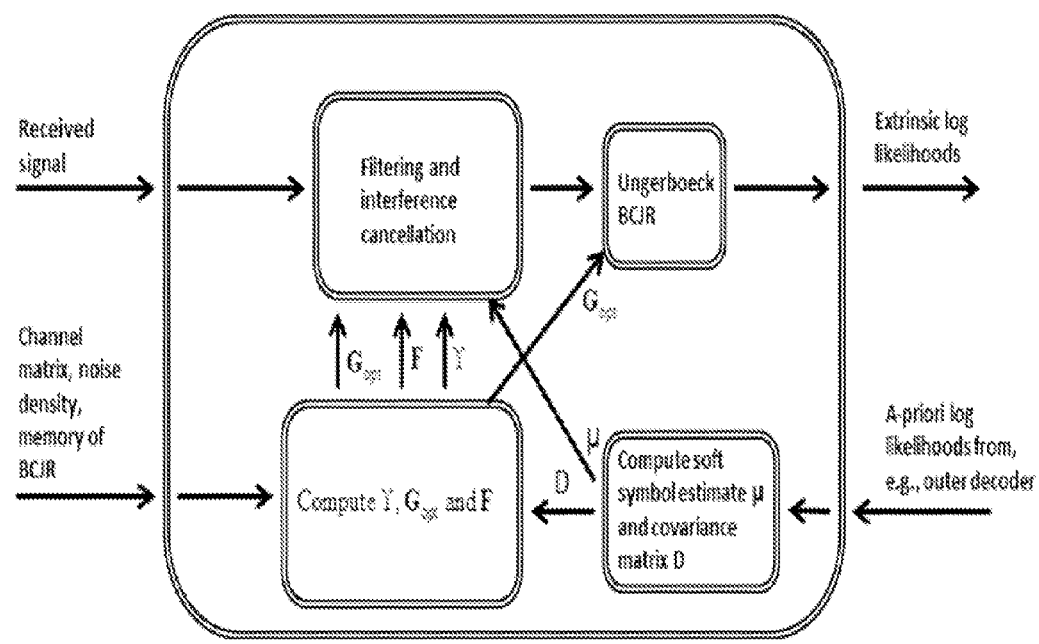
FIG. 3 illustrates a system model of a embodiment of the present invention.

FIG. 3 illustrates a system model of an embodiment of the present invention. The figure illustrates the order among the operations needed to synthesize the present detection method: (i) based on the prior LLRs, the parameters µ and D are computed. (ii) Based on µ, D, the channel matrix H, the noise density $N_0$, and the BCJR memory length L, the parameters Γ, $G_{opt}$, and F are computed. (iii) The received signal y is thereafter filtered and interference cancelled based on µ, Γ, $G_{opt}$, and F, which produces E(x|y,µ). (iv) The BCJR, whose operations are fully specified through $G_{opt}$, is finally applied to the signal E(x|y,µ).

Figure 4:
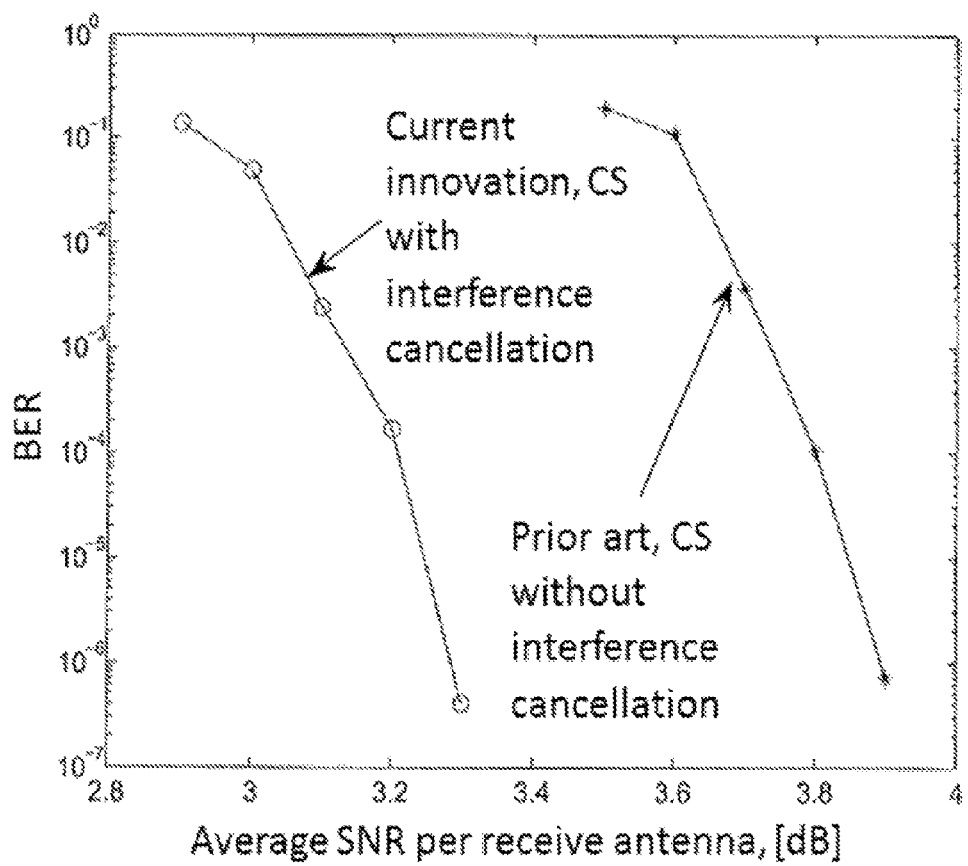
FIG. 4 shows performance results for a detector device according to the present invention.

Simulation results of the present invention and prior art are shown in FIG. 4 for 6×6 MIMO systems with quadrature phase-shift keying (QPSK) inputs. The outer ECC is an irregular (2050, 4100) low-density parity-check (LDPC) code, and it follows that the 4100 code symbols are transmitted over 342 channel matrices H. All channel matrices within each code block are assumed independent and comprise independent complex Gaussian random variables. We consider a memory 1 channel shortening receiver, so we set L=1. This implies that there are 4 states in the BCJR, which should be compared with a complexity of 4096 for the full complexity BCJR. In FIG. 4, the left curve is the performance result of a proposed receiver according to the invention, while the right curve is the CS prior art receiver. From the curves a clear improvement can be seen with a method according to the present invention.

Moreover, as understood by the person skilled in the art, any method according to the present invention may also be implemented in a computer program, having code means, which when run by processing means causes the processing means to execute the steps of the method. The computer program is included in a computer readable medium of a computer program product. The computer readable medium may comprises of essentially any memory, such as a ROM, a PROM, an EPROM, a Flash memory, an EEPROM, or a hard disk drive.

Furthermore, the present method can be implemented and executed in suitable detection devices, and it is realized by the skilled person that the present detection device may comprise the necessary communication capabilities in the form of e.g., functions, means, units, elements, etc., for executing the methods according to the invention which means that the devices can be modified, mutatis mutandis, according to any method of the present invention. Examples of other such means, units, elements and functions are: memory, encoders, decoders, mapping units, multipliers, interleavers, deinterleavers, modulators, demodulators, inputs, outputs, antennas, amplifiers, digital signal processors (DSPs), etc. which are suitably arranged together for correct operation.

Especially, the processors of the present detection device may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Figure 5:
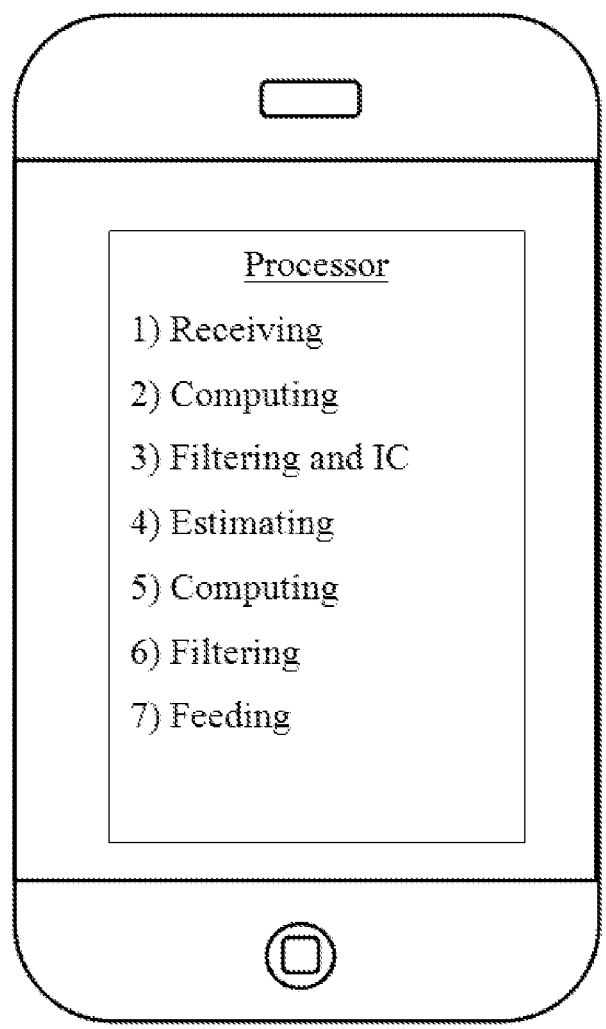
FIG. 5 shows an embodiment of a detector device according to the invention.

The present detection device comprises a processor which is arranged to execute, mutatis mutandis, the corresponding method steps. FIG. 5 shows an example of a detector device according to the invention. As shown, the processor executes the different steps according to the invention. The detector device can e.g. be a receiver device or be a part of such a receiver device arranged for communication in a wireless communication system. However, the detection device can also be a standalone detection device coupled to a receiver device, communication processing device or any other suitable communication device receiving communication signals.

Figure 6:
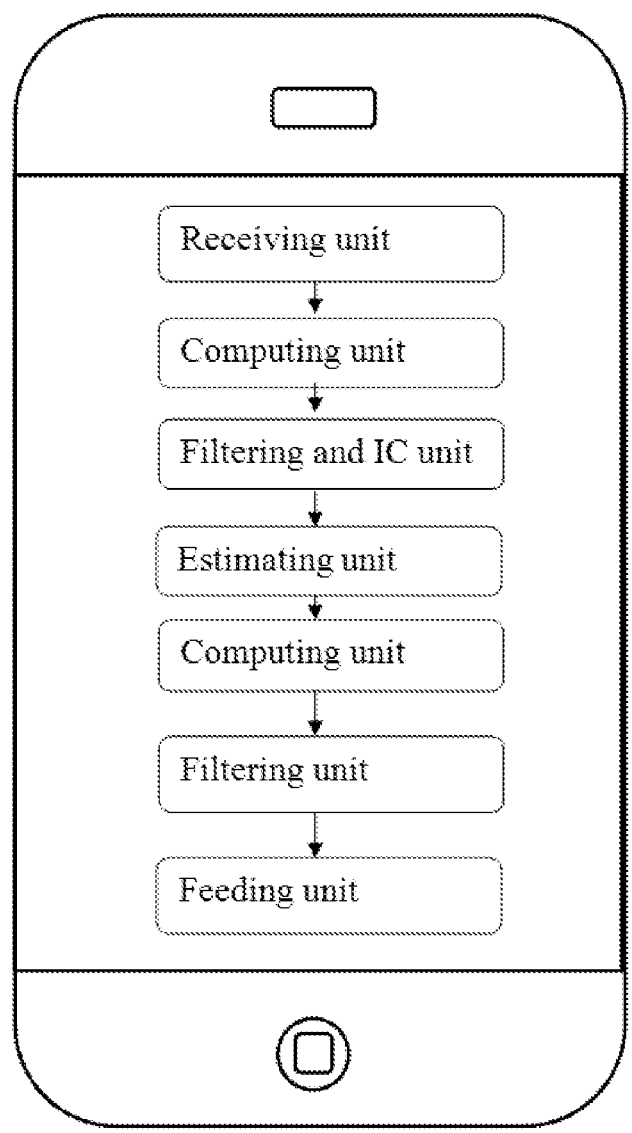
FIG. 6 shows an alternative embodiment of a detector device according to the invention.

Alternatively, according to another embodiment of the invention, the present receiver device comprises a receiver unit, a computing unit, a filtering and interference cancellation unit, an estimating unit, a computing unit, a filtering unit, and a feeding unit all arranged to execute the corresponding method steps. FIG. 6 shows an example of a receiver device according to the alternative embodiment of the invention. As shown, each functional unit executes its associated step of the invention are inter-coupled accordingly.

Figure 7:
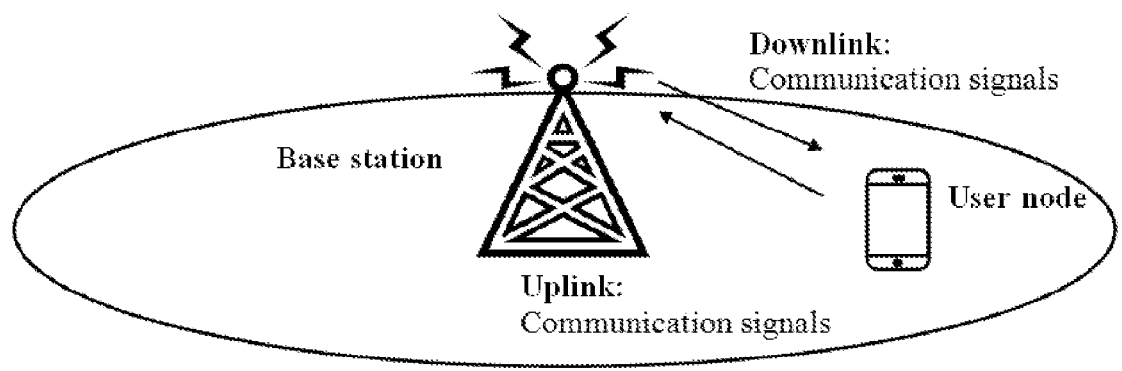
FIG. 7 shows a communication system overview.

The method and corresponding detector device can be used in any suitable wireless communication system. Example of such system is cellular systems such as LTE and LTE Advanced (LTE-A) in which communication is performed in the uplink and the downlink between base stations and user nodes (UEs). FIG. 7 illustrates a system overview of a cellular system with uplink and downlink transmission of communication signals.

Finally, it should be understood that the present invention is not limited to the embodiments described above, but also relates to and incorporates all embodiments within the scope of the appended independent claims.

What is claimed is:

1. A method for detection of symbols carried in received communication signals, the method comprising:
    receiving at least one communication signal y transmitted over a radio channel H, wherein said received signal y comprises encoded radio channel symbol inputs x;
    receiving a priori Log Likelihood Ratios (LLRs) of said channel inputs x;
    computing soft symbol estimates µ and variance D of said channel inputs x based on LLRs of said channel inputs x;
    filtering and interference cancelling said received signal y by using a first filter and filtered soft symbol estimates µ to obtain a filtered and interference cancelled received signal, wherein a kth element of said filtered and interference cancelled received signal has a form $r_k=E(x_k|y, \mu_l)$, $l \notin I_k$, where E is the expectation operator and $I_k$ is a set of indices that depends on k in a pre-determined fashion, and wherein the vector comprising $r_k$, $\forall k$, is denoted as E(x|y,µ);
    estimating the Mean Square Error (MSE) matrix B of said filtered and interference cancelled received signal;
    computing an optimal matrix $G_{opt}$ for a Bahl-Cook-Jelinke-Raviv (BCJR) algorithm based on said MSE estimate B, wherein said optimal matrix $G_{opt}$ specifies the BCJR algorithm;
    further filtering said filtered and interference cancelled received signal by using a second filter to obtain an input signal r to the BCJR algorithm, wherein the second filter is derived from said optimal matrix $G_{opt}$; and
    feeding said input signal r into the BCJR algorithm to obtain extrinsic LLRs of said channel inputs x.

2. The method according to claim 1, wherein the LLRs of said channel inputs x are obtained from a decoder, and wherein the method further comprises:

feeding said extrinsic LLRs into the decoder to obtain updated LLRs of said channel inputs x; and repeating said computing the soft symbol estimates μ and variance D, filtering and interference cancelling, estimating the MSE matrix B, computing the optimal matrix $G_{opt}$, filtering said filtered and interference cancelled received signal, feeding said input signal r, and feeding said extrinsic LLRs into the decoder i number of times by using said updated LLRs to compute soft symbol estimates μ and variance D.

3. The method according to claim 1, wherein the first filter is a modified Wiener filter for said radio channel inputs x having mean μ and variance D.

4. The method according to claim 1, wherein the second filter has a form $(G_{opt}+I)$, where I is the identity matrix.

5. The method according to claim 1, wherein said radio channel H is a linear radio channel.

6. The method according to claim 1, wherein the communication signal is transmitted in a cellular wireless communication system.

7. A method for detection of symbols carried in received communication signals, the method comprising:

receiving at least one communication signal y transmitted over a radio channel H, wherein said received signal y comprises encoded radio channel symbol inputs x;

receiving a priori Log Likelihood Ratios (LLRs) of said channel inputs x;

computing soft symbol estimates μ and variance D of said channel inputs x based on LLRs of said channel inputs x, wherein the LLRs of said channel inputs x are obtained from a decoder;

filtering and interference cancelling said received signal y by using a first filter and filtered soft symbol estimates μ to obtain a filtered and interference cancelled received signal, wherein a kth element of said filtered and interference cancelled received signal has a form $r_k = E(x_k|y, μ_l)$, $l \notin I_k$, where E is the expectation operator and $I_k$ is a set of indices that depends on k in a pre-determined fashion, and wherein the vector comprising $r_k$, $\forall k$, is denoted as $E(x|y,μ)$;

estimating the Mean Square Error (MSE) matrix B of said filtered and interference cancelled received signal;

computing an optimal matrix $G_{opt}$ for a Bahl-Cook-Jelinke-Raviv (BCJR) algorithm based on said MSE estimate B, wherein said optimal matrix $G_{opt}$ specifies the BCJR algorithm;

further filtering said filtered and interference cancelled received signal by using a second filter to obtain an input signal r to the BCJR algorithm, wherein the second filter is derived from said optimal matrix $G_{opt}$; and feeding said input signal r into the BCJR algorithm to obtain extrinsic LLRs of said channel inputs $x_i$;

feeding said extrinsic LLRs into the decoder to obtain updated LLRs of said channel inputs x; and repeating said computing the soft symbol estimates μ and variance D, filtering and interference cancelling, estimating the MSE matrix B, computing the optimal matrix $G_{opt}$, filtering said filtered and interference cancelled received signal, feeding said input signal r, and feeding said extrinsic LLRs into the decoder i number of times by using said updated LLRs to compute soft symbol estimates μ and variance D.

8. The method according to claim 7, wherein said set of indices $I_k$ is $I_k = I_k = \{k-L, k-L+1, \ldots k+L-1, k+L\} \cap \{1, 2, \ldots, N\}$, where N is the total number of elements in said channel inputs x, and wherein L is the memory of the BCJR algorithm.

9. The method according to claim 8, wherein said optimal matrix $G_{opt}$ is solely dependent on said MSE estimate B and the memory L.

10. The method according to claim 8, wherein the memory L is arbitrarily chosen.

11. The method according to claim 7, wherein said MSE estimate B has a form $B(μ)=E[(x-E(x|y,μ))(x-E(x|y,μ))^*]$, where "*" is the Hermitian transpose operator.

12. The method according to claim 7, wherein said input signal r to said BCJR algorithm is obtained as: $r=(G_{opt}+I)E(x|y,μ)$.

13. A non-transitory computer readable medium having computer-executable instructions stored thereon for detection of symbols carried in received communication signals, the computer executable instructions comprising instructions for:

receiving at least one communication signal y transmitted over a radio channel H, wherein said received signal y comprises encoded radio channel symbol inputs x;

receiving a priori Log Likelihood Ratios (LLRs) of said channel inputs x;

computing soft symbol estimates μ and variance D of said channel inputs x based on LLRs of said channel inputs x;

filtering and interference cancelling said received signal y by using a first filter and filtered soft symbol estimates μ to obtain a filtered and interference cancelled received signal, wherein a kth element of said filtered and interference cancelled received signal has a form $r_k=E(x_k|y, μ_l)$, $l \notin I_k$, where E is the expectation operator and $I_k$ is a set of indices that depends on k in a pre-determined fashion, and wherein the vector comprising $r_k$, $\forall k$, is denoted as $E(x|y,μ)$;

estimating the Mean Square Error (MSE) matrix B of said filtered and interference cancelled received signal;

computing an optimal matrix $G_{opt}$ for a Bahl-Cook-Jelinke-Raviv (BCJR) algorithm based on said MSE estimate B, wherein said optimal matrix $G_{opt}$ specifies the BCJR algorithm;

further filtering said filtered and interference cancelled received signal by using a second filter to obtain an input signal r to the BCJR algorithm, wherein the second filter is derived from said optimal matrix $G_{opt}$; and feeding said input signal r into the BCJR algorithm to obtain extrinsic LLRs of said channel inputs x.

14. A detection device arranged for detection of symbols carried in received communication signals, the detection device comprising a processor arranged to:

receive at least one communication signal y transmitted over a radio channel H, wherein said received signal y comprises encoded radio channel symbol inputs x;

receive a priori Log Likelihood Ratios (LLRs) of said channel inputs x;

compute soft symbol estimates μ and variance D of said channel inputs x based on LLRs of said channel inputs x;

filter and interference cancel said received signal y by using a first filter and filtered soft symbol estimates μ to obtain a filtered and interference cancelled received signal, wherein a kth element of said filtered and interference cancelled received signal has a form $r_k=E(x_k|y,μ_l)$, $l \notin I_k$, where E is the expectation operator and $I_k$ is a set of indices that depends on k in a pre-determined fashion, and wherein the vector comprising $r_k$, $\forall k$, is denoted as $E(x|y,μ)$;

estimate the Mean Square Error (MSE) matrix B of said filtered and interference cancelled received signal;

compute an optimal matrix $G_{opt}$ for a Bahl-Cook-Jelinke-Raviv (BCJR) algorithm based on said MSE estimate B, wherein said optimal matrix $G_{opt}$ specifies the BCJR algorithm;

further filter said filtered and interference cancelled received signal by using a second filter to obtain an input signal r to the BCJR algorithm, wherein the second filter is derived from said optimal matrix $G_{opt}$; and feed said input signal r into the BCJR algorithm to obtain extrinsic LLRs of said channel inputs x.

15. The detection device according to claim 14, wherein the LLRs of said channel inputs x are obtained from a decoder, and wherein the processor is further arranged to:

feed said extrinsic LLRs into the decoder to obtain updated LLRs of said channel inputs x; and repeat said compute the soft symbol estimates μ and variance D, filter and interference cancel, estimate the MSE matrix B, compute the optimal matrix $G_{opt}$, filter said filtered and interference cancelled received signal, feed said input signal r, and feed said extrinsic LLRs into the decoder i number of times by using said updated LLRs to compute soft symbol estimates μ and variance D.

\* \* \* \* \*

UNITED STATES PATENT AND TRADEMARK OFFICE
CERTIFICATE OF CORRECTION

PATENT NO. : 9,071,316 B2
APPLICATION NO. : 14/045832
DATED : June 30, 2015
INVENTOR(S) : Fredrik Rusek It is certified that error appears in the above-identified patent and that said Letters Patent is hereby corrected as shown below:

In the Claims

Column 13, Lines 21-62, Claim 7 should read
A method for detection of symbols carried in received communication signals, the method comprising:
receiving at least one communication signal y transmitted over a radio channel H, wherein said received signal y comprises encoded radio channel symbol inputs x;
receiving a priori Log Likelihood Ratios (LLRs) of said channel inputs x;
computing soft symbol estimates $\mu$ and variance D of said channel inputs x based on LLRs of said channel inputs x, wherein the LLRs of said channel inputs x are obtained from a decoder;
filtering and interference cancelling said received signal y by using a first filter and filtered soft symbol estimates $\mu$ to obtain a filtered and interference cancelled received signal, wherein a $k$th element of said filtered and interference cancelled received signal has a form $r_k = E(x_k \mid \mathbf{y}, \mu_l), l \notin I_k$, where $E$ is the expectation operator and $I_k$ is a set of indices that depends on $k$ in a pre-determined fashion, and wherein the vector comprising $r_k, \forall k$, is denoted as $E(\mathbf{x} \mid \mathbf{y}, \mu)$;
estimating the Mean Square Error (MSE) matrix B of said filtered and interference cancelled received signal;
computing an optimal matrix $G_{opt}$ for a Bahl-Cook-Jelinke-Raviv (BCJR) algorithm based on said MSE estimate B, wherein said optimal matrix $G_{opt}$ specifies the BCJR algorithm;
further filtering said filtered and interference cancelled received signal by using a second filter to obtain an input signal r to the BCJR algorithm, wherein the second filter is derived from said optimal matrix $G_{opt}$; and
feeding said input signal r into the BCJR algorithm to obtain extrinsic LLRs of said channel inputs x;
feeding said extrinsic LLRs into the decoder to obtain updated LLRs of said channel inputs x; and
repeating said computing the soft symbol estimates $\mu$ and variance D, filtering and interference cancelling, estimating the MSE matrix B, computing the optimal matrix $G_{opt}$, filtering said filtered and interference cancelled received signal, feeding said input signal r, and feeding said Signed and Sealed this
Sixteenth Day of February, 2016

Michelle K. Lee
*Director of the United States Patent and Trademark Office* extrinsic LLRs into the decoder $i$ number of times by using said updated LLRs to compute soft symbol estimates $\mu$ and variance D.